(12) United States Patent
Cocchi et al.

(10) Patent No.: US 9,301,537 B2
(45) Date of Patent: Apr. 5, 2016

(54) STIRRER OF A MACHINE FOR MAKING AND DISPENSING ICE CREAM PRODUCTS

(71) Applicant: ALI S.p.A.—CARPIGIANI GROUP, Milan (IT)

(72) Inventors: Andrea Cocchi, Bologna (IT); Roberto Lazzarini, Reggio Emilia (IT)

(73) Assignee: ALI S.p.A.—CARPIGIANI GROUP (IT)

( * ) Notice: Subject to any disclaimer, the term of this patent is extended or adjusted under 35 U.S.C. 154(b) by 255 days.

(21) Appl. No.: 13/921,864

(22) Filed: Jun. 19, 2013

(65) Prior Publication Data
US 2014/0000302 A1    Jan. 2, 2014

(30) Foreign Application Priority Data
Jun. 27, 2012    (IT) .............................. BO2012A0357

(51) Int. Cl.
*A23G 9/22*    (2006.01)
*B01F 7/00*    (2006.01)

(52) U.S. Cl.
CPC .............. *A23G 9/224* (2013.01); *B01F 7/0065* (2013.01); *B01F 7/00208* (2013.01); *B01F 7/00433* (2013.01); *B01F 7/00583* (2013.01)

(58) Field of Classification Search
CPC ................................................... A23G 9/224
USPC .................. 366/149, 310; 165/94; 62/545
See application file for complete search history.

(56) References Cited

U.S. PATENT DOCUMENTS

| | | | | |
|---|---|---|---|---|
| 1,289,613 A | * | 12/1918 | Beill | ............................... 165/94 |
| 2,030,969 A | | 2/1936 | Cushman | |
| 2,836,401 A | | 5/1958 | Phelan | |
| 2,847,197 A | * | 8/1958 | Thompson | .................... 366/311 |
| 2,850,268 A | * | 9/1958 | Miller et al. | .................. 366/245 |
| 3,145,017 A | | 8/1964 | Thomas | |
| 3,035,420 A | | 5/1965 | Stoelting et al. | |
| 3,292,911 A | | 12/1966 | Paul | |
| 4,274,751 A | | 6/1981 | Rector et al. | |
| 4,732,013 A | | 3/1988 | Beck | |
| 5,556,201 A | * | 9/1996 | Veltrop et al. | ................. 366/203 |
| 6,637,214 B1 | | 10/2003 | Leitzke et al. | |
| 2007/0140053 A1 | | 6/2007 | Jejcic | |

FOREIGN PATENT DOCUMENTS

| | | |
|---|---|---|
| EP | 0495211 | 7/1992 |
| FR | 1183900 | 7/1959 |
| FR | 2218133 | 9/1974 |
| FR | 2931036 | 11/2009 |

OTHER PUBLICATIONS

Italy Search Report dated Apr. 5, 2013 from counterpart application.

* cited by examiner

*Primary Examiner* — David Sorkin
(74) *Attorney, Agent, or Firm* — Timothy J. Klima; Shuttleworth & Ingersoll, PLC

(57) ABSTRACT

A stirrer of a machine for making and dispensing ice cream products rotates about an axis inside a cylindrical mixing and freezing unit and comprises a plurality of helical scrapers extending around the axis and operating on an inside wall of the mixing and freezing unit to be scraped, a shaft for rotating the stirrer about the axis and mounting the helical scrapers at a first end of them. Each helical scraper comprises a guide and at least one scraping member which can be slidably coupled to and uncoupled from the guide.

16 Claims, 5 Drawing Sheets

US 9,301,537 B2

STIRRER OF A MACHINE FOR MAKING AND DISPENSING ICE CREAM PRODUCTS

This application claims priority to Italian Patent Application BO2012A000357 filed Jun. 27, 2012, the entirety of which is incorporated by reference herein.

BACKGROUND OF THE INVENTION

This invention relates to a stirrer of a machine for making and dispensing ice cream products.

More specifically, reference is made in this description to machines for making and dispensing soft ice cream.

Machines of this kind usually comprise a mixing and freezing cylinder inside which a basic product is mixed and cooled to obtain a finished product.

Inside the cylinder, the machine is equipped with a power-driven stirrer which not only mixes the basic product continuously to make the finished ice cream as smooth as possible but, at the same time, also causes the finished ice cream to advance towards a dispensing nozzle.

One problem suffered by these machines regards the formation of a layer of ice or frozen basic product on the inside wall of the mixing and freezing cylinder.

Indeed, while the product is being stirred, pieces of this ice layer come away from the cylinder wall and fall into the product being made.

This not only worsens the quality of the finished ice cream, which is less smooth on account of the pieces of ice of various sizes inside it but also creates the risk of damaging the stirrer because the pieces of ice impact the stirrer as it rotates.

For this reason, prior art stirrers are equipped with elements, called "scrapers", which prevent the formation of the layer of ice by continuously scraping the inside wall of the mixing and freezing cylinder while the stirrer rotates.

Normally, however, during use of the machine, the stirrer is never fully immersed in the product or in the ice cream being processed which means that in very long operating cycles, a certain amount of basic product, ice cream, or ice tends to stick and build up on the stirrer.

These build-ups remain on the stirrer and are not mixed into the rest of the product being processed which means that over time, they harbor bacteria, which reduces the quality of the ice cream produced and makes it unsafe for consumption.

It is therefore necessary to subject the stirrers and, in particular, the scrapers, to periodic cleaning cycles.

Some prior art types of stirrers consist of a single metallic "body" and the scrapers form an integral part of the stirrer structure. These stirrers have a very complex structure and reaching all parts of it is very difficult Correct and thorough cleaning of all its parts is not therefore guaranteed.

In other types of stirrers known in the prior art, the scraper is a separate part which is mounted to the stirrer using springs and other elastic elements.

These systems, however, are somewhat awkward to dismantle and their maintenance is a lengthy, painstaking task.

Moreover, owing to the complexity of these systems, correct cleaning of all the parts is, again, not guaranteed and there is the risk of bacteriological contamination in this case, too.

SUMMARY OF THE INVENTION

This invention therefore has for an aim to provide a stirrer of a machine for making and dispensing ice cream products which overcomes the above mentioned disadvantages of the prior art.

More specifically, the aim of the invention is to provide a stirrer which is quicker and easier to clean in all its parts.

The technical purpose indicated and the aims specified are substantially achieved by a stirrer of a machine for making and dispensing ice cream products, comprising the technical features described herein.

BRIEF DESCRIPTION OF THE DRAWINGS

These and other innovative features of the invention, and the advantages it offers, will become more apparent from the following detailed description of a preferred, non-limiting embodiment of it, with reference to the accompanying drawings, in which.

DESCRIPTION OF THE PREFERRED EMBODIMENTS

Figure 1:
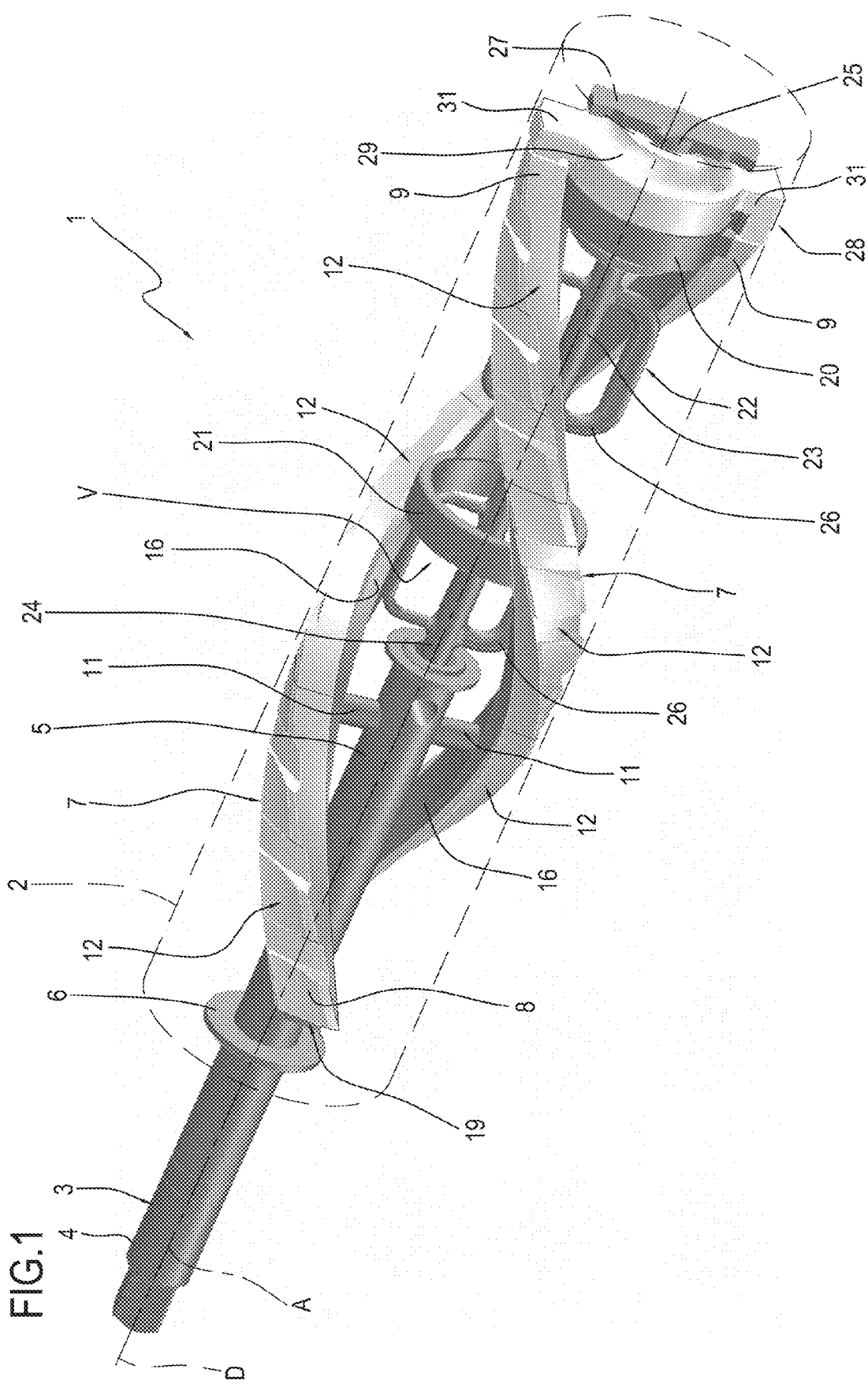
FIG. 1 is a perspective view of a stirrer according to this invention.

The numeral 1 in FIG. 1 denotes in its entirety a stirrer according to this invention.

More specifically, the stirrer 1 is a stirrer of the type designed to be installed in cylindrical mixing and freezing unit of a machine for making and dispensing ice cream products, such as, for example, soft ice cream.

The mixing and freezing unit, labeled 2 and schematically represented by the dashed line in FIG. 1, extends mainly along an axis D.

The stirrer 1 is rotatable about an axis of rotation A, coinciding with the axis of extension D of the mixing and freezing unit 2 and is set in rotation through the agency of a shaft 3 connected to motor means not illustrated.

The rotation shaft 3 has a first portion 4 and a second portion 5, separated from each other by an annular flange 6. The first portion 4 projects towards the outside of the mixing and freezing unit 2 and is connected to the motor means, while the second portion 5 projects towards the inside of the mixing and freezing unit 2.

The stirrer 1 comprises a plurality of helical scrapers 7 extending around the axis A.

The helical scrapers 7 are mounted on the rotation shaft 3 at a first end 8 of them, rotate as one therewith and operate on a cylindrical inside wall 10 of the mixing and freezing unit 2 to scrape the wall 10 so to prevent the formation of layers of ice or frozen product on the wall 10 itself.

Figure 3:
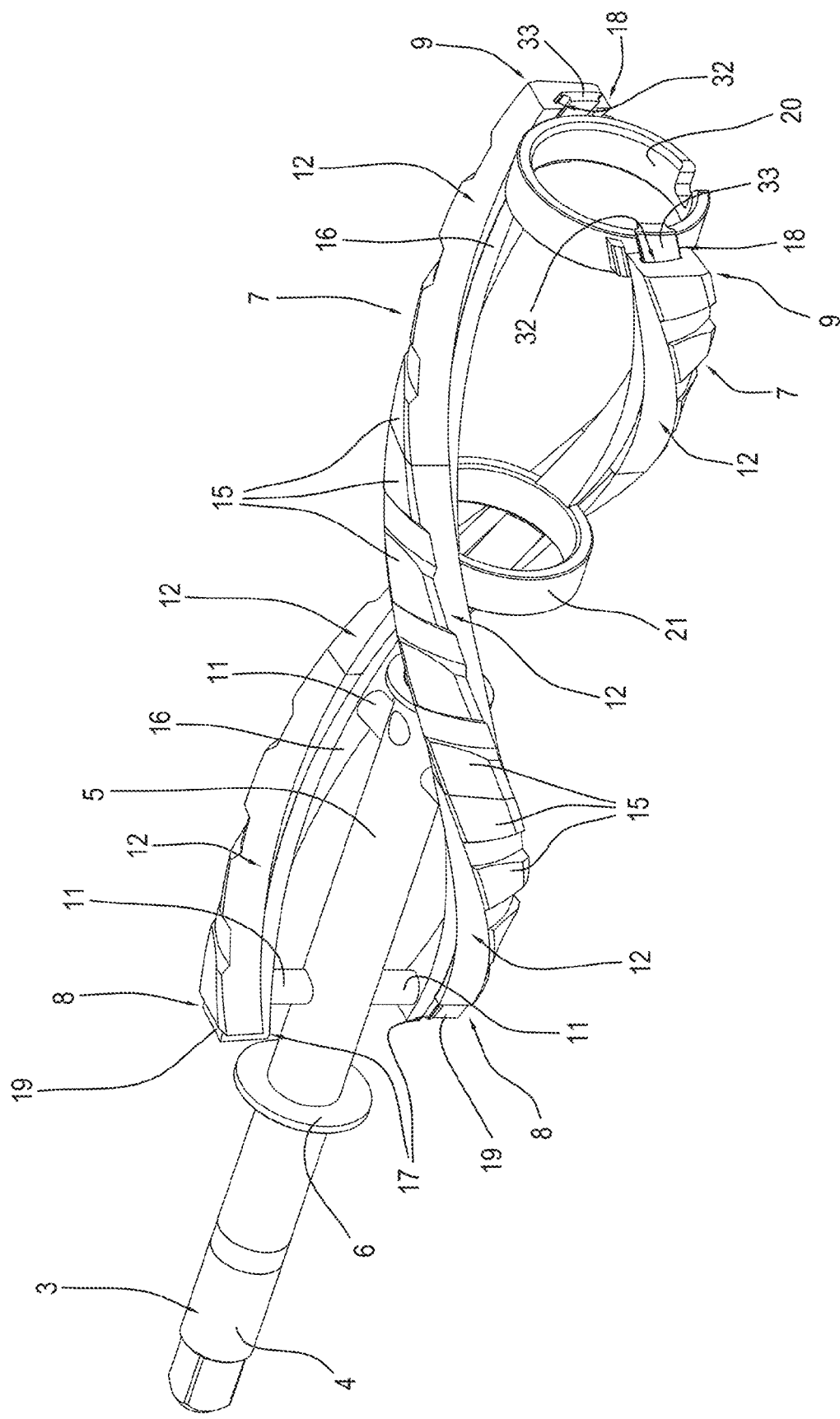
FIGS. 3 and 4 are perspective views showing a first detail from FIG. 1 in different operating configurations.
Figure 4:
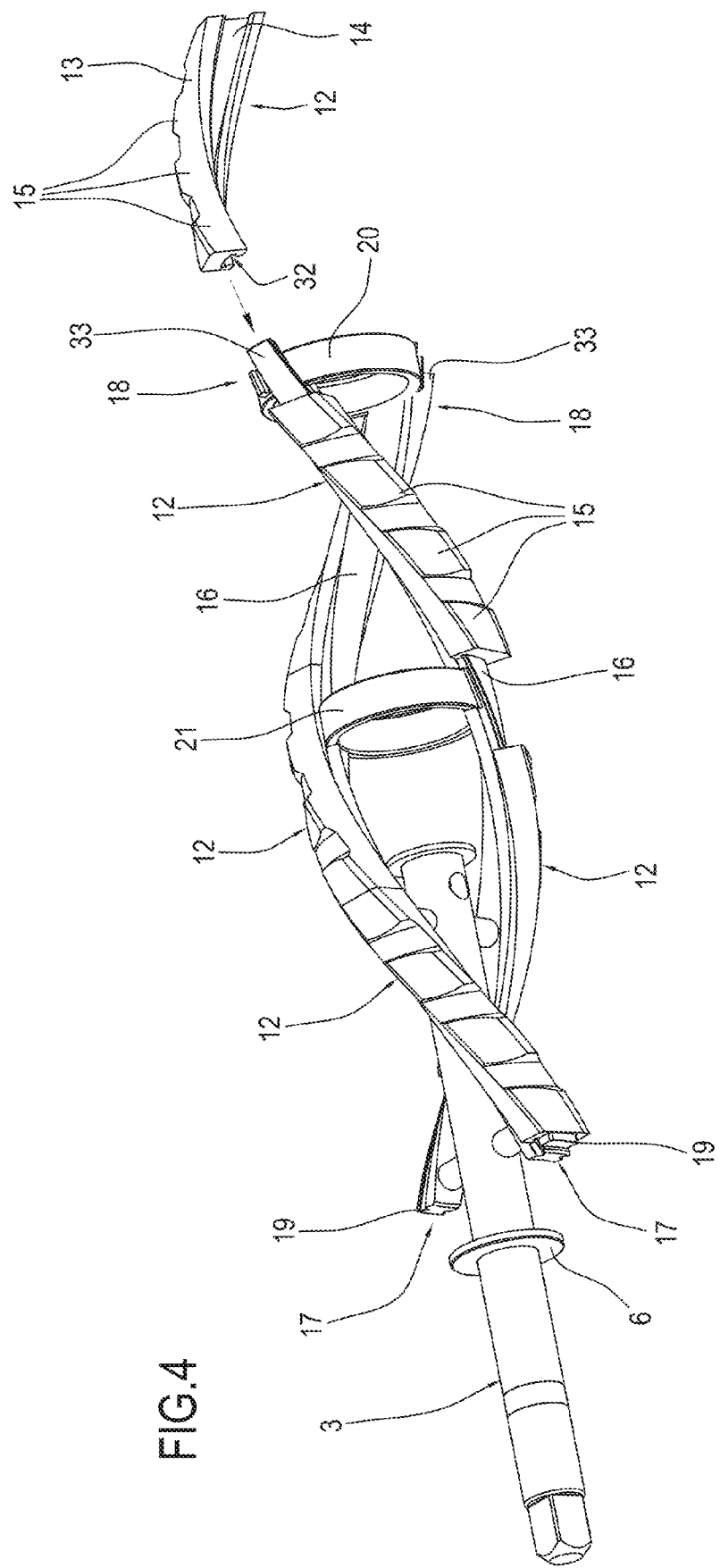

As dearly shown in FIGS. 1, 3 and 4, the helical scrapers 7 are solidly connected to the second portion 5 of the shaft 3 by a plurality of pins 11.

The helical form of the scrapers 7 around the axis A creates a central empty space V, whose utility and function are described in more detail below.

The helical scrapers 7 apply a continuous scraping action on the inside wall 10 of the mixing and freezing unit 2 during processing of the product so as to prevent the formation of the aforementioned layer of ice which, if it were to form and fall into the product being made, would spoil its quality and would damage or break the stirrer 1.

Each helical scraper 7 is equipped with at least one scraping member 12 acting on the inside wall 10 of the mixing and freezing unit 2.

The scraping member 12 is equipped, at a first portion 13 of it, with a plurality of scraping blades 15 which come into contact with the inside wall 10 of the mixing and freezing unit 2 as the stirrer 1 rotates.

Figure 5:
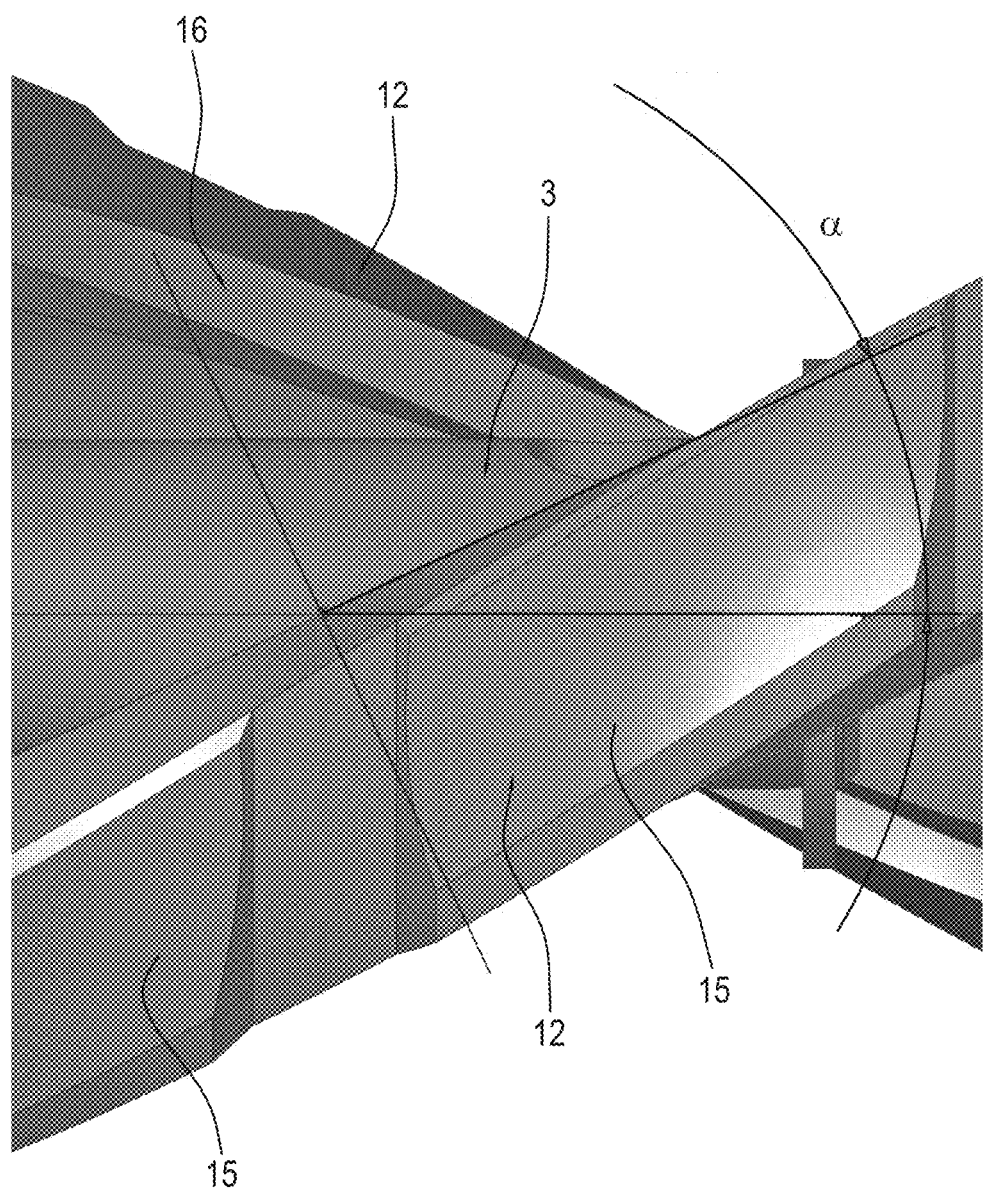
FIG. 5 is an enlarged view of a second detail from FIG. 1.

As shown in FIG. 3, the scraping blades 15 are spaced apart in order to allow better aeration of the product being processed. Further, the blades 15 are inclined at a constant and fixed angle to an imaginary plane tangent to the inside wall 10 of the mixing and freezing unit 2, thereby optimizing the scraping action. More precisely, each blade 15 has a fixed angle of incidence. As better shown in FIG. 5, the angle of incidence, labeled α, has a value of between 20° and 30°. Preferably, the angle of incidence a is 25°.

The adoption of a plurality of scraping blades 15 also allows the product being processed to be mixed more uniformly, thus obtaining a smoother, better quality ice cream.

Another function of the blades 15 is to facilitate advancing the product towards a dispensing zone Z at an outlet of the mixing and freezing unit 2. The fixed angle of the blades 15 allows the product to be advanced towards the outlet of the mixing and freezing unit 2 at a more gradual speed, which in turn allows dispensing in a more controlled manner.

In the preferred embodiment illustrated in the accompanying drawings, each helical scraper 7 has a guide 16 and the scraping member 12 is slidably coupled to the guide 16 at a second portion 14 of it (FIG. 4). The guide 16 is preferably of the flat, prismatic type. Also, the guide 16 extends substantially for the full length of the respective helical scraper 7.

More specifically, each helical scraper 7 comprises a plurality of scraping members 12. Each of the scraping members 12 can be slidably coupled and uncoupled to and from the respective guide 16.

The use of a guide 16, which is integral with the respective helical scraper 7, is advantageously useful because it allows each scraping member 12 to be quickly coupled and uncoupled. More specifically, this solution is particularly advantageous when one or more of the scraping members 12 needs to be substituted and, above all, to facilitate cleaning of the mixing and freezing unit 2 and of the stirrer 1.

The scraping members 12 are made of a plastic material so as to reduce friction with the inside wall 10 of the mixing and freezing unit 2, which is preferably made of stainless steel. The use of scraping members 12 made of plastic reduces scraper wear caused by friction against the wall 10, thus increasing their working life, and also limits the costs of manufacturing and replacing the scraping members 12.

With reference to FIG. 4, the scraping members 12 are coupled to the respective guide 16 by insertion, preferably at a second end 9 of the helical scraper 7, in the direction indicated by the arrow in the figure.

The first scraping member 12 to be inserted is made to slide in the guide 16 until it comes into contact with an end stop, labeled 19 in FIGS. 3 and 4, located at a first end 17 of the guide 16.

The scraping members 12 inserted after that are then made to slide until each of them comes into contact with the scraping member 12 inserted before it.

More specifically, when coupling the scraping members 12 to the guide 16, the scraping members 12 are in contact with each other in consecutive pairs thus forming an uninterrupted piece of material between one member 12 and the next.

In other words, the scraping members 12 are placed in contact with each other without creating small gaps between one scraping member 12 and the adjacent one, where product or ice might collect, allowing bacteria to thrive which would contaminate the product being processed.

Furthermore, the scraping members 12 thus abutting against each other define a continuity of material between one scraping member 12 and the next. In other words, it is as if each helical scraper 7 had a single scraping member 12, with the advantage of mixing the product more uniformly, giving it a smoother consistency and allowing the finished product to advance at a more constant rate towards the dispensing zone Z.

As shown in FIG. 3, the stirrer comprises a first annular member 20 for supporting the helical scrapers 7. The helical scrapers 7 are connected to each other by the first annular member 20 at the second end 9.

The stirrer 1 also has a second annular member 21 which supports and connects the helical scrapers 7 to each other at a position substantially halfway between the first end 8 and the second end 9 of the helical scrapers 7.

In the preferred embodiment of it, the stirrer 1 has two helical scrapers 7 and each of them is connected to the first annular member 20 and to the second annular member 21 at diametrically opposite points of the circumferential edge of the respective annular member.

The first annular member 20 and the second annular member 21 are coaxial with the axis of rotation A. More specifically, the first annular member 20 and the second annular member 21 define between the helical scrapers 7 the aforementioned central empty space V.

The central empty space V is designed to house a counter-stirrer of known type, labeled 22 in the drawings.

The counter-stirrer 22 comprises a central stem 23, whose axis of extension coincides with the axis of rotation A. The counter-stirrer 22 is connected, at a first end 24 of the stem 23, to the rotation shaft 3. More specifically, this connection allows the counter-stirrer 22 to turn freely about the rotation shaft 3 in such a way that, during operation, the counter-stirrer 22 and the helical scrapers 7 are movable in rotation relative to each other.

The counter-stirrer 22 further comprises stirring members 26, consisting of rod-like members bent into a U shape and solidly connected, in diametrically opposite pairs, to the stem 23.

Figure 2:
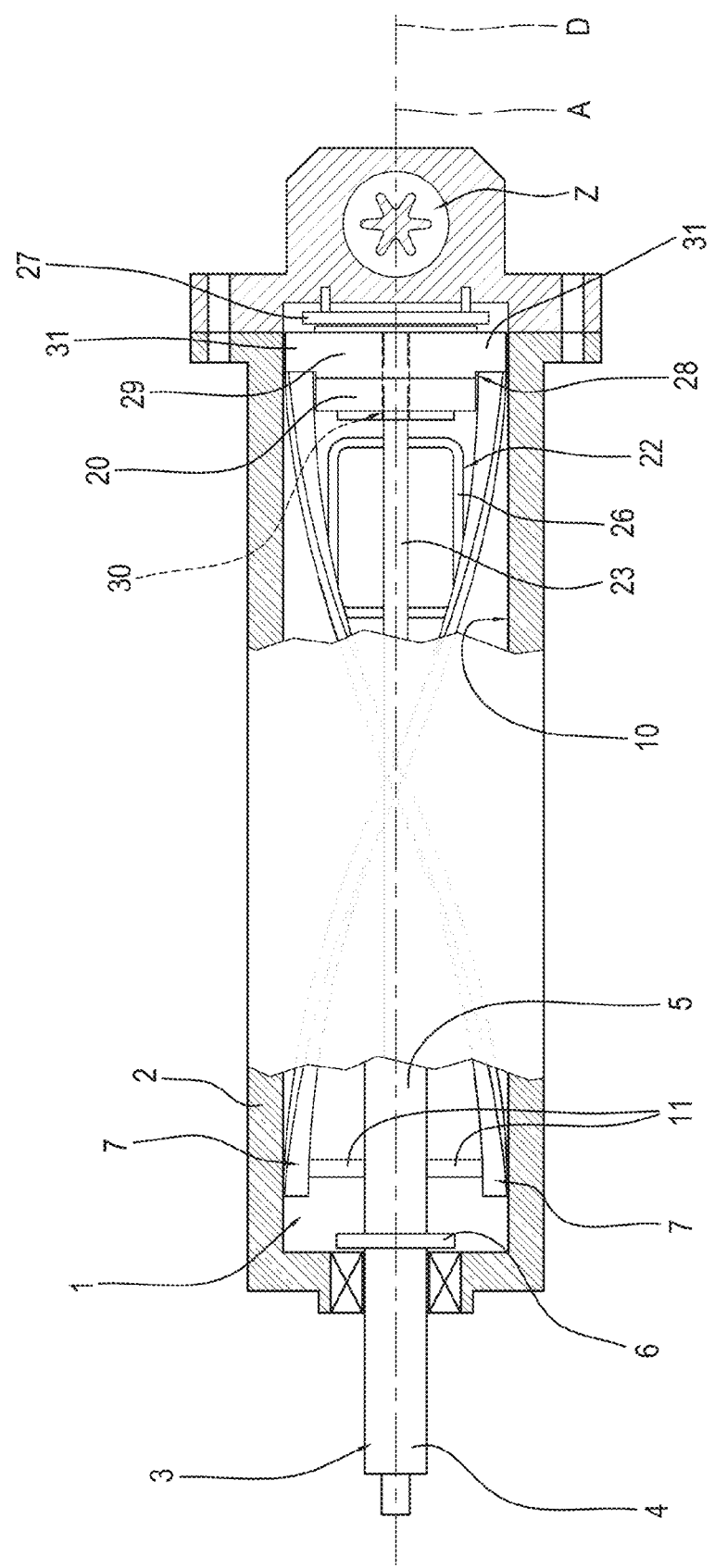
FIG. 2 is a side view in cross section of the stirrer of FIG. 1.

At a second end 25 of the stem 23, opposite to the first end 24, the counter-stirrer 22 has a plate 27 which is fixed to the stem 23 and which engages in known manner the mixing and freezing unit 2 (FIGS. 1 and 2). That way, during rotation of the stirrer 1, the counter-stirrer 22 remains fixed relative to the helical scrapers 7 and thus, as stated above, the helical scrapers 7 and the counter-stirrer 22 are movable in rotation relative to each other.

The stirrer 1 comprises locking means 28 which engage solidly with the helical scrapers 7 at the respective second ends 9 thereof and which are such as to prevent each scraping member 12 from being uncoupled from the respective guide 16 during the rotation of the stirrer 1.

More precisely, the locking means 28 comprise body 29 which engages solidly with the helical scrapers 7.

More specifically, the body 29 is substantially "cap-like" in shape and solidly engages the first annular member 20.

The body 29 has a central hole 30, through which the stem 23 of the counter-stirrer 22 passes, and the aforementioned plate 27 is located on the side of the body 29 opposite to the stirring members 26 (FIG. 1). Thus, during operation, the "cap-like" body 29, being integral with the stirrer 1, rotates about the stem 23 of the counter-stirrer 22, which is integral with the mixing and freezing unit 2 through the agency of the plate 27.

The body 29 has, for each guide, a protrusion 31 defining a second end stop designed to prevent movement and uncoupling of the scraping members 12 during the rotation of the stirrer 1.

As illustrated in FIG. 1, the body 29 has two protrusions 31, located on diametrically opposite sides of the body 29. Each of the protrusions 31 has a slot 32 which mates with an end section 33 of each guide 16 (FIG. 4). The length of each helical scraper 7, and hence of each guide 16, is such that an end section of the guide 16 is not engageable by the last scraping member 12 inserted. That way, each protrusion 31 of the "cap-like" body 29 can engage the respective end section 33, thus guaranteeing that the scraping members 12 of one guide 16 and the other are simultaneously locked in position. Further, the use of a single body 29 also allows both of the guides 16 to be immediately "released", making it easier to uncouple the scraping members 12 and quicker to perform maintenance and cleaning operations on the stirrer 1.

The stirrer 1 as described offers numerous advantages.

First of all, the stirrer 1, as described, can be quickly and easily dismantled into all its parts.

For this reason, the stirrer 1 is easy to clean because all its parts are fully accessible.

More specifically, as described in detail above, cleaning and maintenance operations are easier because the scraping members 12 can be uncoupled from the guides 16 by an operator without using special instruments or tools.

The scraping members 12 might also be different in geometry and in the structure of the blades 15, for example to adapt the operation of the stirrer 1 to specific properties of the product being processed, such as density, viscosity, etc.

Furthermore, the use of a plurality of scraping members 12 does not adversely affect the correct mixing of the product being processed or the scraping action because the scraping members 12 are placed in close contact with each other to create a continuity of material so that it is as if each helical scraper 7 were equipped with a single scraping member 12. The continuity of the material thus allows the inside wall 10 to be scraped more evenly and continuously.

The continuity of material also prevents small gaps from being created between one scraping member 12 and another, where deposits of product or ice can form between the scraping members 12.

Furthermore, the particular structure of the scraping blades 15, having a fixed angle of incidence ($\alpha$) allows the product being processed to be better mixed and aerated, thus obtaining a smoother, better quality ice cream and allowing the product to advance at a more constant rate towards the dispensing zone Z to better control the dispensing of the finished product.

Lastly, the use of scraping members 12 made of plastic reduces friction with the inside wall 10 of the mixing and freezing unit 2, thus reducing wear, increasing working life and limiting manufacturing and replacement costs.

The invention described above is susceptible of industrial application. It can be modified and adapted in several ways without thereby departing from the scope of the inventive concept. Moreover, all the details of the invention may be substituted for technically equivalent elements.

What is claimed is:

1. A stirrer of a machine for making and dispensing ice cream products, the stirrer comprising:
    an axis about which the stirrer is rotatable;
    a plurality of helical scrapers extending around the axis for operating on an inside wall of a cylinder to be scraped,
    a shaft for rotating the stirrer about the axis and mounting the helical scrapers at a first end of the helical scrapers,
    wherein each helical scraper comprises a guide and at least one scraping member which is slidably couplable to and uncouplable from the guide,
    wherein each scraping member includes a plurality of individual scraping blades, each of the individual scraping blades having a fixed angle of incidence ($\alpha$) relative to an imaginary cylinder immediately surrounding the stirrer and defined by the axis;
    wherein each helical scraper comprises a plurality of scraping members positioned longitudinally consecutively along the helical scraper;
    wherein for every pair of consecutive scraping members coupled to the respective guide, the scraping members in the pair are in mutual contact in order to define continuity of material between one scraping member and the other;
    wherein each scraping member includes a plurality of scraping blades which are longitudinally spaced apart one from another in series along the scraping member.

2. The stirrer according to claim 1, wherein the angle of incidence ($\alpha$) has a value of between 20° and 30°.

3. The stirrer according to claim 2, wherein the angle of incidence ($\alpha$) has a value of 25°.

4. The stirrer according to claim 1, wherein each guide comprises a first end stop, located at a respective first end, for stopping sliding movement of the scraping members.

5. The stirrer according to claim 1, comprising a locking mechanism engaging solidly with the helical scrapers at a respective second end of each helical scraper and which prevents each scraping member from being uncoupled from the respective guide.

6. The mixing and freezing unit according to claim 5, wherein the locking mechanism comprises a body which engages solidly with the helical scrapers, the body comprising, for each guide, a respective protrusion; each protrusion defining, for the respective guide, a second end stop to prevent uncoupling of the scraping members during use.

7. The stirrer according to claim 1, wherein the guide is substantially a flat prismatic guide.

8. The stirrer according to claim 1, wherein each scraping member is made of plastic material.

9. A mixing and freezing unit of a machine for making and dispensing ice cream products, comprising;
    a cylinder including an axis;
    a stirrer positioned in the cylinder and rotatable about the axis, the stirrer comprising:
    a plurality of helical scrapers extending around the axis and operating on an inside wall of the cylinder to be scraped,
    a shaft for rotating the stirrer about the axis and mounting the helical scrapers at a first end of the helical scrapers,
    wherein each helical scraper comprises a guide and at least one scraping member which is slidably couplable to and uncouplable from the guide,
    wherein each scraping member includes a plurality of individual scraping blades, each of the individual scraping blades having a fixed angle of incidence ($\alpha$) relative to the inside wall of the cylinder;
    wherein each helical scraper comprises a plurality of scraping members positioned longitudinally consecutively along the helical scraper;
    wherein for every pair of consecutive scraping members coupled to the respective guide, the scraping members in the pair are in mutual contact in order to define continuity of material between one scraping member and the other;

wherein each scraping member includes a plurality of scraping blades which are longitudinally spaced apart one from another in series along the scraping member.

10. The mixing and freezing unit according to claim 9, wherein the angle of incidence ($\alpha$) has a value of between 20° and 30°.

11. The mixing and freezing unit according to claim 10, wherein the angle of incidence ($\alpha$) has a value of 25°.

12. The mixing and freezing unit according to claim 9, wherein each guide comprises a first end stop, located at a respective first end, for stopping sliding movement of the scraping members.

13. The mixing and freezing unit according to claim 9, comprising a locking mechanism engaging solidly with the helical scrapers at a respective second end of each helical scraper and which prevents each scraping member from being uncoupled from the respective guide.

14. The mixing and freezing unit according to claim 13, wherein the locking mechanism comprises a body which engages solidly with the helical scrapers, the body comprising, for each guide, a respective protrusion; each protrusion defining, for the respective guide, a second end stop to prevent uncoupling of the scraping members during use.

15. The mixing and freezing unit according to claim 9, wherein the guide is substantially a flat prismatic guide.

16. The mixing and freezing unit according to claim 9, wherein each scraping member is made of plastic material.

* * * * *